(12) United States Patent
Yusef et al.

(10) Patent No.: US 10,751,940 B2
(45) Date of Patent: Aug. 25, 2020

(54) RECOATER FOR 3D PRINTERS

(71) Applicant: HEWLETT-PACKARD DEVELOPMENT COMPANY, L.P., Houston, TX (US)

(72) Inventors: Haseeb Yusef, Vancouver, WA (US); William Winters, Vancouver, WA (US); Jordi Gimenez Manent, Sant Cugat del Valles (ES); Xavier Gasso Puchal, Sant Cugat del Valles (ES); Eduardo Ruiz Martinez, Sant Cugat del Valles (ES); Drew Berwager, Vancouver, WA (US); Brent Ewald, Vancouver, WA (US); Micah Aberth, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 202 days.

(21) Appl. No.: 16/075,444

(22) PCT Filed: Oct. 27, 2016

(86) PCT No.: PCT/US2016/059178
§ 371 (c)(1),
(2) Date: Aug. 3, 2018

(87) PCT Pub. No.: WO2018/080507
PCT Pub. Date: May 3, 2018

(65) Prior Publication Data
US 2019/0039301 A1    Feb. 7, 2019

(51) Int. Cl.
*B29C 64/218* (2017.01)
*B33Y 30/00* (2015.01)
(Continued)

(52) U.S. Cl.
CPC ............ *B29C 64/218* (2017.08); *B22F 3/008* (2013.01); *B22F 3/1055* (2013.01);
(Continued)

(58) Field of Classification Search
None
See application file for complete search history.

(56) References Cited

U.S. PATENT DOCUMENTS

| 7,037,382 B2 | 5/2006 | Davidson et al. |
| 7,789,037 B2 | 9/2010 | Teulet |

(Continued)

FOREIGN PATENT DOCUMENTS

EP    1988430 A1    11/2008

OTHER PUBLICATIONS

Donoghue[a], et al., "The effectiveness of combining rolling deformation with Wire-Arc Additive Manufacture on β-grain refinement and texture modification in Ti-6Al-4V", Materials Characterization, Retrieved from Internet: http://www.sciencedirect.com/science/article/pii/S1044580316300262, vol. 114, Apr. 2016, pp. 103-114.

(Continued)

*Primary Examiner* — Mary Lynn F Theisen
(74) *Attorney, Agent, or Firm* — Mannava & Kang, P.C.

(57) ABSTRACT

According to an example, a recoater for a three-dimensional (3D) printer may include a cylindrical element having a surface to spread build material particles. The build material particles may have a specified average dimension and the surface may include a plurality of depressions that have dimensions that are smaller than the specified average dimension of the build material particles.

15 Claims, 3 Drawing Sheets

(51) Int. Cl.
　　　*B29C 64/153*　　(2017.01)
　　　*B33Y 10/00*　　(2015.01)
　　　*B22F 3/00*　　(2006.01)
　　　*B22F 3/105*　　(2006.01)
　　　*B29C 64/165*　　(2017.01)

(52) U.S. Cl.
　　　CPC .......... *B29C 64/153* (2017.08); *B29C 64/165* (2017.08); *B33Y 10/00* (2014.12); *B33Y 30/00* (2014.12); *B22F 2003/1056* (2013.01)

(56) References Cited

U.S. PATENT DOCUMENTS

| | | |
|---|---|---|
| 9,254,535 B2 | 2/2016 | Buller et al. |
| 2015/0139849 A1 | 5/2015 | Pialot et al. |
| 2015/0367415 A1* | 12/2015 | Buller .................... B22F 3/004 |
| | | 419/53 |
| 2016/0271877 A1 | 9/2016 | Suzuki et al. |
| 2017/0066190 A1* | 3/2017 | Klein .................... B33Y 10/00 |
| 2017/0144371 A1* | 5/2017 | Lussier ................ B29C 64/153 |
| 2019/0126551 A1* | 5/2019 | Campderros Canas .. B22F 3/00 |

OTHER PUBLICATIONS

Roy et al., "μ-SLS of Metals: Design of the Powder Spreader, Powder Bed Actuators and Optics for the System", Department of Mechanical Engineering, The University of Texas, Retrieved from Internet: http://sffsymposium.engr.utexas.edu/sites/default/files/2015/2015-11-Roy.pdf, 2015, 22 pages.

* cited by examiner

RECOATER FOR 3D PRINTERS

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed through curing of polymer-based build materials.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
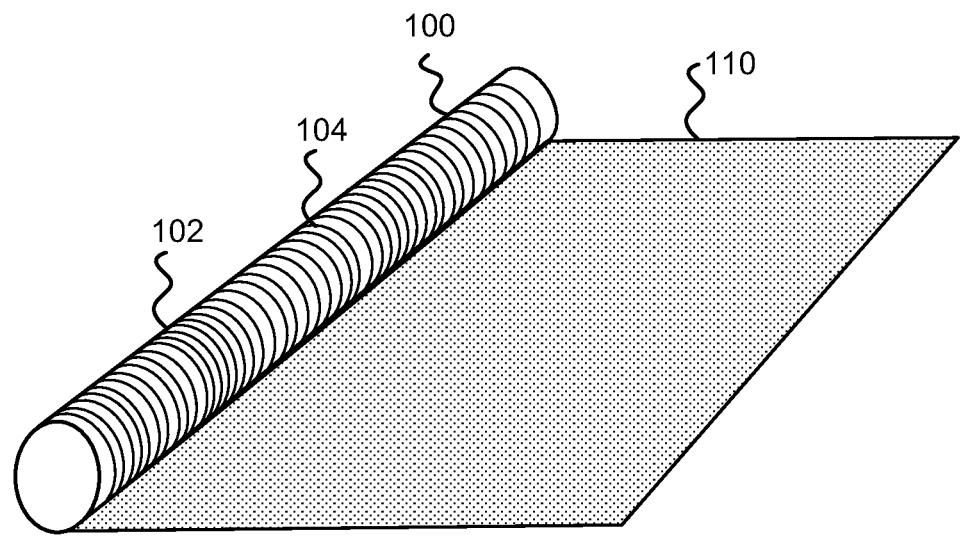
FIG. 1 shows a simplified perspective view of an example recoater for a three-dimensional (3D) printer.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

During an example build material particle spreading phase of an additive printing process, a dose or pile of the build material particles may be pushed by a rotating and translating roller to create a layer of particles that is to be printed upon and fused together. The roller may have a highly polished hard coated roller surface. Build material particles may randomly become attached to the polished surface of the roller from static or other adhesion mechanisms. The attached particles may form bumps of various geometries on the roller surface and may create asymmetric and randomly changing surface ripples and zones of varying thickness and density on the layer of the particles being spread.

Disclosed herein are recoater for a 3D printer, a 3D printer having a recoater, and a method for operating a printer. The recoater disclosed herein may be employed to spread build material particles into a layer and may have a plurality of depressions, for instance, in the form of indentations and/or grooves. According to an example, the grooves may be arranged in a cylindrically oriented, helically oriented, or a combination of both, manner across the surface of the recoater. In addition, the grooves may have widths that are smaller than a specified average dimension of the build material particles. According to an example, the depressions and/or grooves may be tuned to characteristics of the build material, such as flow and other relevant properties of the build material particles, such that the tuning may result in the recoater spreading the build material particles in an improved manner compared to a recoater having a smooth surface The depressions and/or grooves on the recoater surface may enable build material particles to be spread in a significantly more uniform and flatter manner than when rollers having highly polished surfaces are employed. In other words, for instance, some of the build material particles may become inserted into the grooves as the recoater is translated and rotated on the build material particles, which may create a thin uniform layer on the surface of the recoater. Additionally, the depressions and/or grooves on the recoater surface along with the particles contained in the depressions and/or grooves may cause a continuous augering and agitation of the build material particles, which may reduce or eliminate random peaks and valleys from forming on the layer as the build material particles are spread and leading to a reduced variation in the thickness of the layer.

With reference first to FIG. 1, there is shown a simplified perspective view of an example recoater 100 for a three-dimensional (3D) printer. It should be understood that the recoater 100 depicted in FIG. 1 may include additional components and that some of the components described herein may be removed and/or modified without departing from a scope of the recoater 100 disclosed herein.

The recoater 100, which may also be referenced as a roller, a spreader, or the like, may be formed of a cylindrical element having a surface 102 that is to contact and spread build material particles 110, for instance, across a build area platform. The build material particles 110 may be particles of materials such as polymers, plastics, metals, ceramics, or combinations thereof and may be used to generate 3D objects or parts. The build material particles 110 may be formed to have widths that are formed according to a specified average dimension. For instance, the build material particles 110 may be fabricated through processes that are designed to cause the build material particles 110 to have dimensions that are equal to the specified average dimension. During the manufacture of the build material particles 110 to have the specified average dimension, the build material particles 110 may be formed with other dimensions, for instance, dimensions that are relatively smaller or larger than the specified average dimension. By way of particular example, the build material particles 110 may be formed to have dimensions, e.g., widths, heights, diameters, and/or lengths, that are on average, around 50 microns. In other examples, the build material particles 110 may be formed to have other average dimensions, such as around 40 microns, 60 microns, or the like.

The recoater 100 may be a hollow tube or a solid tube formed of metal, such as chrome, nickel, stainless steel, etc. In addition or as another example, the recoater 100 may be formed of another material and may be coated with chrome, nickel, stainless steel, etc. In any regard, the surface 102 of the recoater 100 may be formed to have a relatively high level of polish. The surface 102 of the recoater 100 may also be formed to include a plurality of depressions 104 formed across a longitudinal axis of the recoater 100. In the example shown in FIG. 1, the depressions 104 may be a plurality of grooves 104 that extend around a circumference of the cylindrical element surface 102 in a cylindrical orientation. That is, the plurality of grooves 104 may extend in a direction that is generally perpendicular to the longitudinal axis of the recoater 100. The term "generally" may be defined to include angles that are about ±10° of perpendicular.

Figure 2:
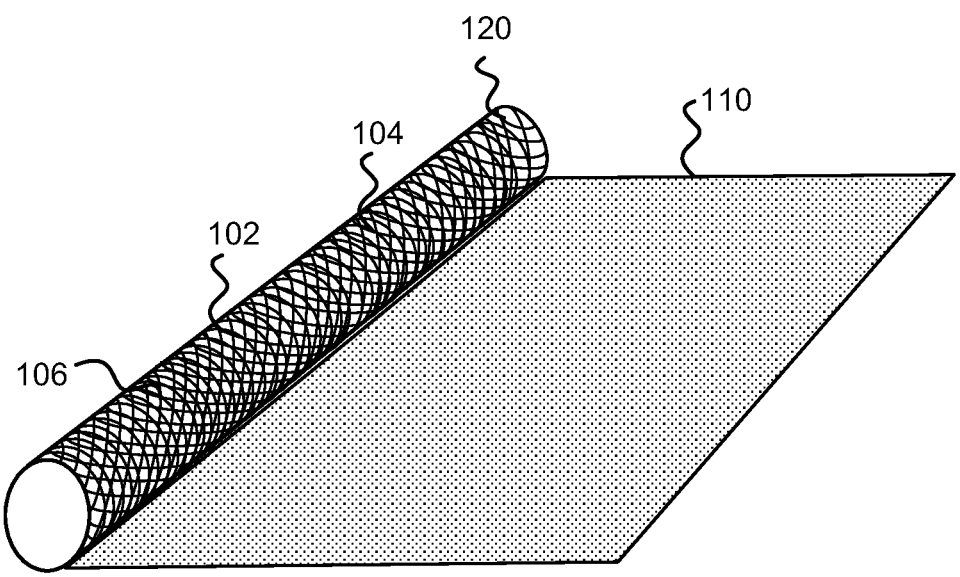
FIG. 2 shows a simplified perspective view of another example recoater for a 3D printer.
Figure 3:
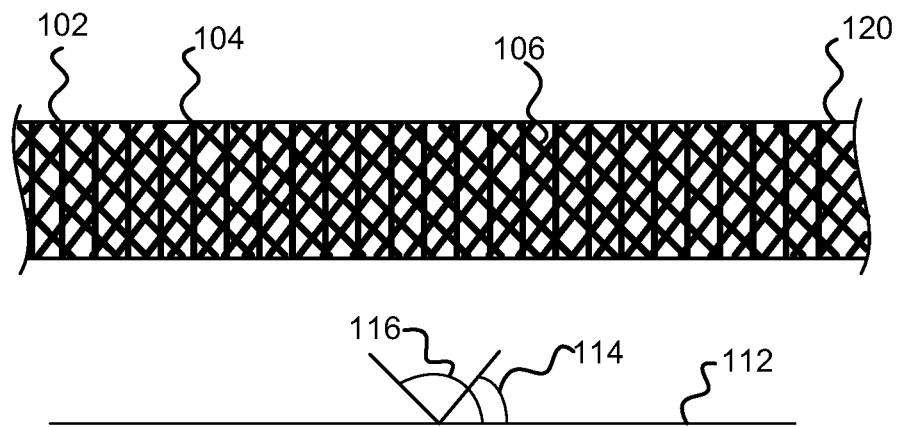
FIG. 3 shows a simplified front view of a portion of the example recoater depicted in FIG. 2.

Turning now to FIGS. 2 and 3, there are respectively shown a simplified perspective view and a partial frontal view of another example recoater 120. The recoater 120 shown in FIGS. 2 and 3 may include all of the features of the recoater 120 shown in FIG. 1. Additionally, the recoater 120 may include a second set of grooves 106 that extend around the circumference in a helical orientation. That is, the second set of grooves 106 may extend at singular or multiple angles. By way of example, some of the grooves 106 may be at a first angle 114 with respect to the longitudinal axis (represented by line 112) of the recoater 120 and others of the grooves 106 may be a second angle 114 with respect to the longitudinal axis 112 of the recoater 120 as also shown in FIG. 3. The first angle 114 may be an angle that is between about 30° and about 60° from the longitudinal axis 112 of the cylindrical element and the second angle 116 is an angle that is between about 120° and about 150° from the longitudinal axis 112 of the cylindrical element.

According to an example, the grooves 104, 106 may have widths that are smaller than the specified average dimension of the build material particles 110 with which the recoater 120 is intended to be used. Thus, for instance, the widths of the grooves 104, 106 may be tuned to the specified average dimension of the build material particles 110. As another example, build material particles 110 having a certain specified average dimension may be selected based upon the widths of the grooves 104, 106. In any regard, the widths of the grooves 104, 106 may be sized such that the build material particles 110 having dimensions smaller than the widths of the grooves 104, 106 may enter into the grooves 104, 106 and may become retained in the grooves 104, 106. As discussed above, although the build material particles 110 may be fabricated to have the specified average width, some of the build material particles 110 may have smaller or larger widths. By way of particular example in which the specified average dimension of the build material particles 110 is about 50 microns, the grooves 104, 106 may have widths that may range from about 1 micron to about 40 microns. In addition, the grooves 104, 106 may have depths that range from about 1 micron to about 20 microns.

The angles at which the grooves 104, 106 are formed onto the surface 102 of the recoater 100, 120 may also be tuned based upon flow characteristics of the build material particles 110. That is, different angles at which the grooves 104, 106 are formed on the surface 102 may differently affect the spreading of the build material particles 110. The spreading of the build material particles 110 may also differ based upon the build material particles 110 themselves. For instance, grooves 104, 106 arranged at a first set of angles may result in different spreading characteristics for different build material particles 110. Moreover, the densities at which the grooves 104, 106 are formed on the surface 102 may also be tuned based upon the flow characteristics of the build material particles 110. The densities may generally refer to the number of grooves 104, 106 formed along the surface 102 and may thus be defined by the spacing between the grooves 104, 106. By way of particular example, the grooves 104 may be spaced apart from each other by about 10 and about 50 microns and the grooves 106 may be spaced apart from each other by about 10 and about 50 microns.

According to an example, the widths of the grooves 104, 106, the angles at which the grooves 104, 106 are positioned on the surface 102, and the densities at which the grooves 104, 106 are formed on the surface 102 may be tuned to different types of build material particles 110 through testing and measurements. The velocities at which the build material particles 110 are spread may also be factored in the tuning. For instance, widths, angles, and spacings for the grooves 104, 106 of a recoater 100, 120 that is translated and rotated at particular velocities and that may result in a substantially flat and uniform distribution of a specified type of build material particles 110 may be identified through the testing and measurements. In other examples, the widths, angles, and spacings for the grooves 104, 106 of a recoater 100, 120 may be identified through performance of calculations. In one regard, the widths, angles, and spacings of the grooves 104, 106 that result in a maximized flat and uniform distribution for particular types of build material particles 110 and recoater 100, 120 rotation and translation velocities may be identified. Additionally, the recoater 100, 120 may be formed with the identified widths, angles, and spacings and may be used in a 3D printer.

Figure 4:
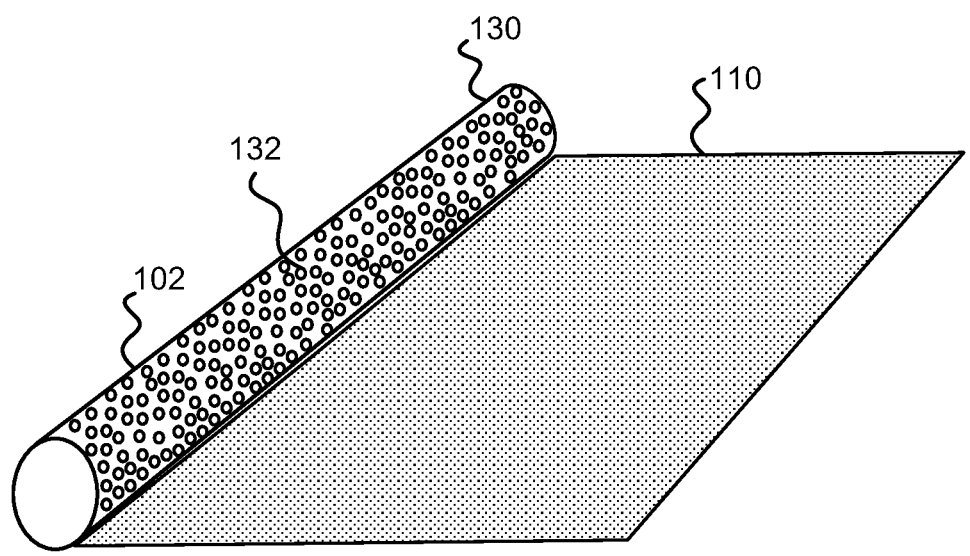
FIG. 4 shows a simplified perspective view of a further example recoater for a 3D printer.

With reference now to FIG. 4, there is shown a simplified perspective view another example recoater 130. The recoater 130 shown in FIG. 4 may also be formed of a cylindrical element similar to the cylindrical element discussed above with respect to the recoaters 100, 120 depicted in FIGS. 1-3. The recoater 130 may differ from the recoaters 100, 120 in that the recoater 130 may include a plurality of unconnected depressions 132 formed on the surface 102 of the recoater 130. The unconnected depressions 132 may also be termed holes or indentations on the surface 102. Similarly to the grooves 104, 106 on the surfaces 102 of the recoaters 100, 120, the depressions 132 may have widths that are smaller than the specified average dimensions of the build material particles. By way of particular example, the depressions 132 may have widths of between about 1 micron and about 40 microns and may have depths that range from about 1 micron and about 20 microns. Additionally, the depressions 132 may be spaced apart from each other by about 10 and about 50 microns.

In other examples, the recoater 130 may also include the grooves 104 and/or 106 shown in FIGS. 2 and 3. In these examples, the surface 102 of the recoater 130 may include both the grooves 104 and/or 106 and the depressions 132 provided in an arrangement that may be tuned to enhance and/or maximize flatness and uniformity of a layer of the build material particles 110 that is spread by the recoater 130.

The grooves 104, 106 and the depressions 132 may be formed on the surface 102 of the cylindrical elements depicted in FIGS. 1-4 in any suitable manner. For instance, the grooves 104, 106 may be formed through contact of Aluminum Oxide particles on the cylindrical elements as the cylindrical elements are rotated. For instance, 40-320 Grit Aluminum Oxide particles, which may be provided in the form of sandpaper, may be directly applied to the surface of the cylindrical elements as the cylindrical elements are rotated at about 200 rpm to form cylindrically oriented grooves 104. In addition, the Aluminum Oxide particles may be translated during rotation of the cylindrical elements to form the helically oriented grooves 106. As another example, honing stones having a specific crystalline structure may be provided on a fixture and may be directly applied to the surface 102 of the cylindrical elements as the cylindrical elements to form the grooves 104, 106. The honing stones may also be translated during rotation of the cylindrical elements form the helically oriented grooves 106. As a further example, the grooves 104, 106 and/or depressions 132 may be formed through bead blasting of the surface 102. As a yet further example, acid etching may be performed on the surface 102 to form the depressions 132 shown in FIG. 4.

Figure 5:
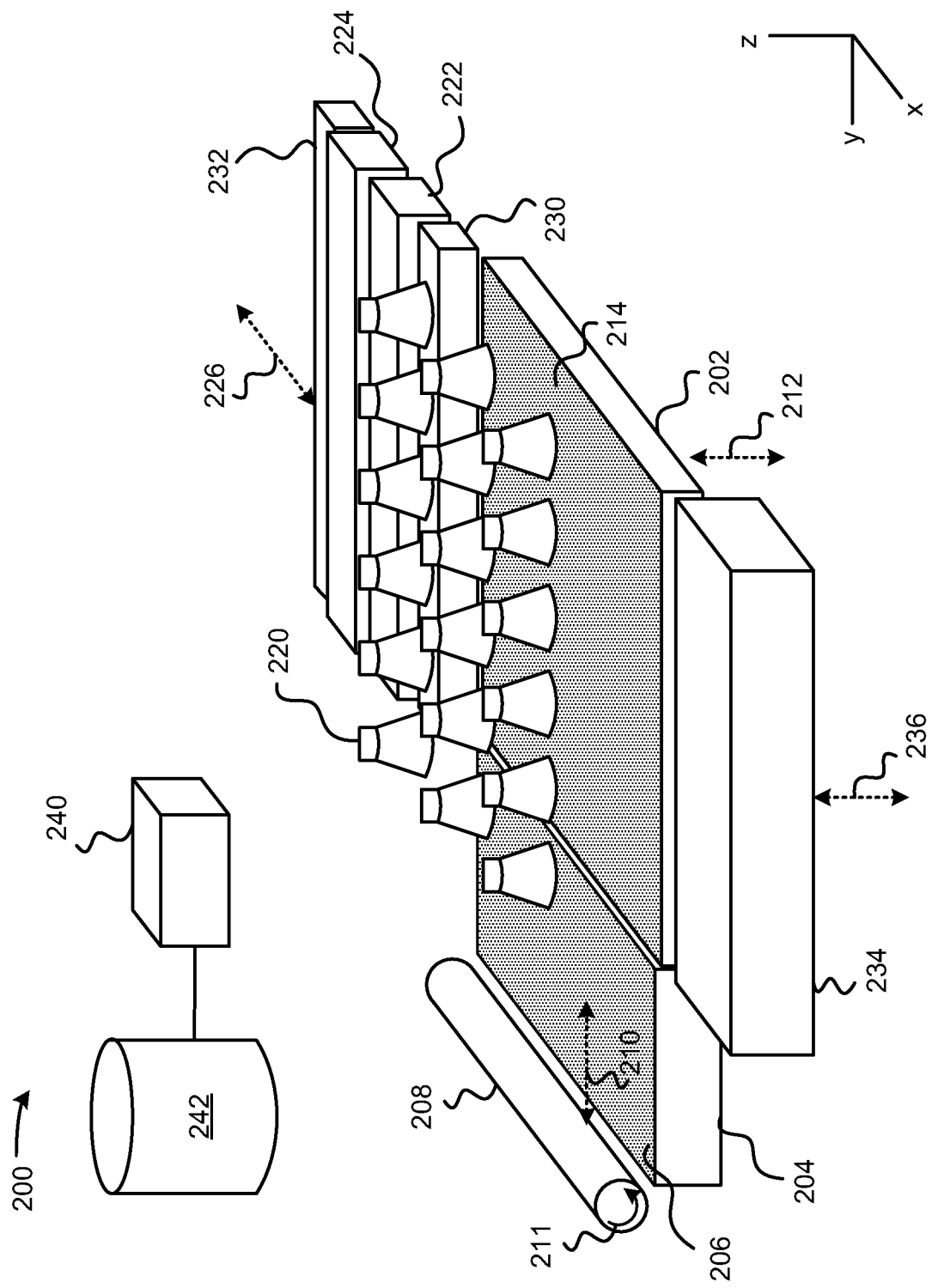
FIG. 5 shows a simplified block diagram of an example 3D printer that may include an example recoater shown in FIGS. 1-4.

With reference now to FIG. 5, there is shown a simplified block diagram of an example three-dimensional (3D) printer 200 that may implement a recoater 100, 120, 130 depicted in FIGS. 1-4. The 3D printer 200 may include a build area platform 202, a build material particle bin 204 containing build material particles 206, and a recoater 208. The build material particles 206 may be equivalent to the build material particles 110 and the recoater 208 may be equivalent to any of the recoaters 100, 120, 130 depicted in FIGS. 1-4. The build material particle bin 204 may be a container, tray, or surface that is to position build material particles 206 between the recoater 208 and the build area platform 202. The build material particle bin 206 may be a hopper or a surface upon which the build material particles 206 may be supplied, for instance, from a build material source (not shown) located above the build material particle bin 204. Additionally, or as another example, the build material particle bin 204 may include a mechanism to provide, e.g., move, the build material particles 206 from a storage location to a position to be spread onto the build area platform 202 or a previously formed layer of build material particles 206. For instance, the build material particle bin 204 may include a hopper, an auger conveyer, or the like.

The recoater 208 may be translated in a direction as denoted by the arrow 210, e.g., along the y-axis, over the build material particle bin 204 and across the build area platform 202 to spread the build material particles 206 into a layer 214 over a surface of the build area platform 202. As the recoater 208 is translated in the direction denoted by the arrow 210, the recoater 208 may be rotated. For instance, in the recoater 208 may be rotated in a direction that is counter the direction of translation, e.g., in FIG. 5, the recoater 208 may be rotated in a counter-clockwise direction as denoted by the arrow 211.

As noted above, the recoater 208 may be formed with grooves 104, 106 and/or other types of depressions 132 and some of the build material particles 206 having a dimension that is smaller than the widths of the grooves 104, 106 or depressions 132 may be retained in the grooves 104, 106 and/or depressions 132. The build material particles 206 retained in the grooves 104, 106 and/or depressions 132 may create a thin uniform layer on the surface of the recoater 208, which may result in a relatively consistent recoater 208 surface friction with a pile of the build material particles 206 that may form along a leading edge of the recoater 208 while minimizing asymmetry from static or other forces/charges. Additionally, the grooves 104, 106 and/or the depressions 132 may agitate the build material particles 206 and may reduce adhesion of the build material particles 206 on the surface 102 of the recoater 208. By reducing adhesion of the build material particles 206 on the surface 102 of the recoater 208, the surface of the layer 214 of build material particles 206 may be relatively even, e.g., may not have asymmetric and randomly changing surface ripples and zones of varying thickness and density as may occur with recoaters 208 having smooth surfaces.

The recoater 208 may be employed to form the layer 214 to have a substantially uniform thickness across the build area platform 202. In an example, the thickness of the layer 214 may range from about 90 µm to about 110 µm, although thinner or thicker layers may also be used. For example, the thickness of the layer 214 may range from about 20 µm to about 200 µm, or from about 50 µm to about 200 µm. The recoater 208 may also be returned to a position adjacent the build material particle bin 204 following the spreading of the build material particles 206. In addition, or as another example, a second build material particle bin (not shown) may be provided on an opposite side of the build area platform 202 and the recoater 208 may be positioned over the second build material particle bin after forming the layer 214 of build material particles 206.

The 3D printer 200 may also include a plurality of warming devices 220 arranged in an array above the build area platform 202. Each of the warming devices 220 may be a lamp or other heat source that is to apply heat onto spread layers of the build material particles 206, for instance, to maintain the build material particles 206 within a predetermined temperature range. The warming devices 220 may maintain the temperatures of the build material particles 206 at a relatively high temperature that facilitates the selective fusing of the build material particles 206. That is, the warming devices 220 may maintain the build material particles 206 at a sufficiently high temperature that enables the build material particles 206 upon which fusing agent droplets are provided to fuse together upon receipt of fusing radiation without causing the build material particles 206 to otherwise fuse together. The warming devices 220 may be activated in a non-continuous manner such that the build material particles 206 may be kept within a predetermined temperature range as various processes, including application of fusing radiation, are performed on the build material particles 206.

The 3D printer 200 may further include a first delivery device 222 and a second delivery device 224, which may both be scanned across the layer 214 on the build area platform 202 in both of the directions indicated by the arrow 226, e.g., along the x-axis. For instance, the first delivery device 222 may deposit first liquid droplets as the first delivery device 222 is scanned in an x direction 226 and the second delivery device 224 may deposit second liquid droplets as the second delivery device 224 is scanned in an opposite x direction 226. The first delivery device 222 and the second delivery device 224 may be thermal inkjet printheads, piezoelectric printheads, or the like, and may extend a width of the build area platform 202. The first delivery device 222 and the second delivery device 224 may each include a printhead or multiple printheads available from the Hewlett Packard Company of Palo Alto, Calif.

In other examples in which the first delivery device 222 and the second delivery device 224 do not extend the width of the build area platform 202, the first delivery device 222 and the second delivery device 224 may also be scanned along the y-axis to thus enable the first delivery device 222 and the second delivery device 224 to be positioned over a majority of the area above the build area platform 202. The first delivery device 222 and the second delivery device 224 may thus be attached to a moving XY stage or a translational carriage (neither of which is shown) that is to move the first delivery device 222 and the second delivery device 224 adjacent to the build area platform 202 in order to deposit respective liquids in predetermined areas of the layer 214 of the build material particles 206.

Although not shown, the first delivery device 222 and the second delivery device 224 may each include a plurality of nozzles through which the respective liquid droplets are to be ejected onto the layer 214. The first delivery device 222 may deposit a first liquid and the second delivery device 224 may deposit a second liquid. The first liquid and the second liquid may both be fusing agents, may both be detailing agents, or one may be a fusing agent and the other may be detailing agent. A fusing agent may be a liquid that is to absorb fusing radiation (e.g., in the form of light and/or heat) to cause the build material particles 206 upon which the fusing agent has been deposited to fuse together when the fusing radiation is applied. A detailing agent may be a liquid that may absorb significantly less of the fusing radiation as compared with the fusing agent. In one example, the detailing agent may prevent or significantly reduce the fusing together of the build material particles 206 upon which the detailing agent has been deposited. In other examples, the detailing agent may be implemented to provide coloring to exterior portions of the build material particles 206 that have been fused together.

The first liquid and the second liquid may also include various additives and/or catalysts that either enhance or reduce radiation absorption. For instance, the first liquid may include a radiation absorbing agent, i.e., an active material, metal nanoparticles, or the like. The first liquid and the second liquid may also include any of a co-solvent, a surfactant, a biocide, an anti-kogation agent, a dispersant, and/or combinations thereof.

The first delivery device 222 may be controlled to selectively deliver first liquid droplets onto build material particles 206 in a layer 214 of the build material particles 206. The first liquid droplets may be delivered onto preselected areas of the layer 214, for instance, the areas containing build material particles 206 that are to be fused together to form a part of a 3D object. The second delivery device 224 may also be controlled to selectively deliver second liquid droplets build material particles 206 in a layer 214 of the build material particles 206. The second liquid droplets may be delivered onto preselected areas of the layer 214, for instance, the areas containing build material particles 206 that are to be fused together to form a part of a 3D object.

Following deposition of the first liquid droplets and/or the second liquid droplets onto selected areas of the layer 214 of the build material particles 206, a first radiation generator 230 and/or a second radiation generator 232 may be implemented to apply fusing radiation onto the build material particles 206 in the layer 214. Particularly, the radiation generator(s) 230, 232 may be activated and moved across the layer 214, for instance, along the directions indicated by the arrow 226 to apply fusing radiation in the form of light and/or heat onto the build material particles 206. Examples of the radiation generators 230, 232 may include UV, IR or near-IR curing lamps, IR or near-IR light emitting diodes (LED), halogen lamps emitting in the visible and near-IR range, or lasers with desirable electromagnetic wavelengths. The types of radiation generators 230, 232 may depend, at least in part, on the type of active material used in the liquid(s). According to an example, the first delivery device 222, the second delivery device 224, the first fusing radiation generator 230, and the second fusing radiation generator 232 may be supported on a carriage (not shown) that may be scanned over the build area platform 202 in the directions denoted by the arrow 226.

Following application of liquid droplets during the multiple passes and following application of the radiation to fuse selected sections of the build material particles 206 together, the build area platform 202 may be lowered as denoted by the arrow 212, e.g., along the z-axis. In addition, the recoater 208 may be moved across the build area platform 202 to form a new layer of build material particles 206 on top of the previously formed layer 214. Moreover, the first delivery device 222 may deposit first liquid droplets and the second delivery device 224 may deposit second liquid droplets onto respective selected areas of the new layer of build material particles 206 in single and/or multiple passes as discussed above. The above-described process may be repeated until parts of the 3D object have been formed in a predetermined number of layers to fabricate the 3D object.

Additionally, following a liquid deposition operation across a build material layer or following multiple liquid deposition operations across multiple build material layers, the first delivery device 222 and the second delivery device 224 may be positioned adjacent to a wiping mechanism 234. The wiping mechanism 234 may wipe the nozzles of the first delivery device 222 and the second delivery device 224, as well as the nozzles of additional delivery devices if included in the 3D printer 200. The wiping mechanism 234 may be moved to a position in which a surface, such as a cleaning web (not shown), of the wiping mechanism 234 is in contact with the exterior surfaces of the nozzles. The wiping mechanism 234 may be moved in the z-direction as noted by the arrow 236 to remove debris such as, build material particles 206, liquid, dust, etc., that may be in contact with the exterior surfaces of the first delivery device 222 and the second delivery device 224, to maintain the delivery devices 222, 224 at or above desired performance levels.

As further shown in FIG. 5, the 3D printer 200 may include a controller 240 that may control operations of the build area platform 202, the build material particle bin 204, the recoater 208, the warming devices 220, the first delivery device 222, the second delivery device 224, the radiation generators 230, 232, and the wiping mechanism 234. Particularly, for instance, the controller 240 may control actuators (not shown) to control various operations of the 3D printer 200 components. The controller 240 may be a computing device, a semiconductor-based microprocessor, a central processing unit (CPU), an application specific integrated circuit (ASIC), and/or other hardware device. Although not shown, the controller 240 may be connected to the 3D printer 200 components via communication lines.

The controller 240 is also depicted as being in communication with a data store 242. The data store 242 may include data pertaining to a 3D object to be printed by the 3D printer 200. For instance, the data may include the locations in each build material layer that the first delivery device 222 is to deposit a first liquid and that the second delivery device 224 is to deposit a second liquid to form the 3D object. In one example, the controller 240 may use the data to control the locations on each of the build material layers that the first delivery device 222 and the second delivery device 224 respectively deposit droplets of the first and second liquids.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A recoater for a three-dimensional (3D) printer, said recoater comprising:
   a cylindrical element having a surface to spread build material particles, the build material particles having a specified average dimension and the surface including a plurality of depressions that have dimensions that are smaller than the specified average dimension of the build material particles.

2. The recoater according to claim 1, wherein the depressions have widths that are between about 1 micron and about 40 microns and have depths that are between about 1 micron to about 20 microns.

3. The recoater according to claim 1, wherein the plurality of depressions are a plurality of grooves that extend around a circumference of the cylindrical element in a helical orientation, a cylindrical orientation, or a combination of both with respect to a longitudinal axis of the cylindrical element.

4. The recoater according to claim 3, wherein a first set of the plurality of grooves includes grooves that are oriented at a first angle with respect to a longitudinal axis of the cylindrical element and a second set of the plurality of grooves includes grooves that are oriented at a second angle with respect to the longitudinal axis of the cylindrical element.

5. The recoater according to claim 4, wherein the first angle is an angle that is between about 30° and about 60° from the longitudinal axis of the cylindrical element and the second angle is an angle that is between about 120° and about 150° from the longitudinal axis of the cylindrical element.

6. The recoater according to claim 4, wherein the cylindrical element has a first end and a second end, and wherein the plurality of grooves extend from the first end to the second end.

7. A three-dimensional (3D) printer comprising:
   a roller including a cylindrical element having a surface containing a plurality of grooves that extend around a circumference of the cylindrical element, the plurality of grooves having widths that are smaller than the average dimension of a plurality of build material particles that the roller is to spread into a layer of build material particles.

8. The 3D printer according to claim 7, wherein the plurality of grooves are helically oriented, cylindrically oriented, or a combination of both with respect to a longitudinal axis of the cylindrical element.

9. The 3D printer according to claim 7, wherein the plurality of grooves have widths that are between about 1 micron and about 40 microns and have depths that are between about 1 micron to about 20 microns.

10. The 3D printer according to claim 7, wherein the specified average width of the build material particles is about 50 microns and the plurality of grooves are spaced apart from each other at distances between about 10 microns to about 50 microns.

11. The 3D printer according to claim 7, wherein a first set of the plurality of grooves includes grooves that are oriented at a first angle with respect to a longitudinal axis of the cylindrical element and a second set of the plurality of grooves includes grooves that are oriented at a second angle with respect to the longitudinal axis of the cylindrical element and wherein the first set of the plurality of grooves intersects the second set of the plurality of grooves.

12. The 3D printer according to claim 11, wherein the first angle is an angle that is between about 30° and about 60° from the longitudinal axis of the cylindrical element and the second angle is an angle that is between about 120° and about 150° from the longitudinal axis of the cylindrical element.

13. The 3D printer according to claim 11, wherein the first angle is an angle that is about 45° from the longitudinal axis of the cylindrical element and the second angle is an angle that is about 135° from the longitudinal axis of the cylindrical element.

14. A method for operating a printer, said method comprising:
   translating and rotating a recoater during spreading of build material particles over a build area platform, wherein the build material particles have a specified average dimension and wherein the recoater has a surface including a plurality of depressions having widths that are smaller than the specified average dimension of the build material particles.

15. The method according to claim 14, wherein the plurality of depressions are a plurality of grooves that extend around a circumference of the recoater and have widths that are between about 1 micron and about 40 microns.

* * * * *